United States Patent
Vallese et al.

(10) Patent No.: US 10,623,115 B2
(45) Date of Patent: Apr. 14, 2020

(54) TRANSMITTER BEAMFORMING FOR SELF-INTERFERENCE CANCELLATION

(71) Applicant: QUALCOMM Incorporated, San Diego, CA (US)

(72) Inventors: Pierpaolo Vallese, Nuremberg (DE); Nicola Varanese, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/680,117

(22) Filed: Aug. 17, 2017

(65) Prior Publication Data
US 2018/0062767 A1 Mar. 1, 2018

Related U.S. Application Data

(60) Provisional application No. 62/382,538, filed on Sep. 1, 2016.

(51) Int. Cl.
| | |
|---|---|
| *H04B 15/00* | (2006.01) |
| *H04B 1/525* | (2015.01) |
| *H04B 17/318* | (2015.01) |
| *H04W 16/28* | (2009.01) |
| *H04B 7/0413* | (2017.01) |

(52) U.S. Cl.
CPC ............ *H04B 15/00* (2013.01); *H04B 1/525* (2013.01); *H04B 17/318* (2015.01); *H04W 16/28* (2013.01); *H04B 7/0413* (2013.01)

(58) Field of Classification Search
CPC ...... H04B 15/00; H04B 1/525; H04B 17/318; H04B 7/0413; H04B 7/0617; H04B 7/0626; H04B 7/0634; H04B 7/0689; H04B 7/066; H04W 16/28
See application file for complete search history.

(56) References Cited

U.S. PATENT DOCUMENTS

| | | | |
|---|---|---|---|
| 2012/0082193 A1 | 4/2012 | Van Zelst et al. | |
| 2014/0226520 A1* | 8/2014 | Seo | H04B 7/0434 |
| | | | 370/252 |

(Continued)

FOREIGN PATENT DOCUMENTS

WO     2012027596 A1    3/2012

OTHER PUBLICATIONS

International Search Report and Written Opinion—PCT/US2017/047621—ISA/EPO—dated Oct. 19, 2017.

*Primary Examiner* — George Eng
*Assistant Examiner* — Hung K Du
(74) *Attorney, Agent, or Firm* — Patterson & Sheridan, L.L.P.

(57) ABSTRACT

Aspects of the present disclosure provide methods and apparatus for applying transmitter beamforming for self-interference cancellation. According to aspects, a method generally includes in an acquisition phase, iteratively acquiring received power measurements for different receive chains for transmissions sent via a plurality of beam directions; estimating a self-interference subspace eigenvector based, at least in part, on the received power measurements; based on the estimated self-interference subspace eigenvector, performing a local search of a nullspace to identify a filtering eigenvector; and applying the filtering eigenvector to one or more transmission chains to cancel self-interference on one or more receive chains.

16 Claims, 12 Drawing Sheets

(56) References Cited

U.S. PATENT DOCUMENTS

2015/0056930 A1 2/2015 Locher
2016/0261308 A1* 9/2016 Khojastepour .......... H04B 3/20
2016/0295596 A1* 10/2016 Masmoudi ............... H04B 1/40

* cited by examiner

TRANSMITTER BEAMFORMING FOR SELF-INTERFERENCE CANCELLATION

CROSS-REFERENCE TO RELATED APPLICATIONS

This application claims benefit to U.S. Provisional Patent Application Ser. No. 62/382,538, entitled "Transmitter Beamforming for Self-Interference Cancellation," filed Sep. 1, 2016, and assigned to the assignee hereof, the contents of which are herein incorporated by reference in its entirety.

BACKGROUND

Field

The present disclosure generally relates to beamforming for wireless transmissions, and more specifically to using transmission beamforming to cancel self-interference between transmit chains and receive chains on a wireless device.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Some wireless communication systems may have devices with numerous antennas and transmit/receive chains, for example, for MIMO or beam-steering. Transmissions performed via one or more transmit chains may cause self-interference on one or more receive chains.

SUMMARY

Certain aspects of the present disclosure provide a method for self-interference cancellation by a wireless device. The method generally includes in an acquisition phase, iteratively acquiring received power measurements for different receive chains for transmissions sent via a plurality of beam directions, estimating a self-interference subspace eigenvector based, at least in part, on the received power measurements, based on the estimated self-interference subspace eigenvector, performing a local search of a nullspace to identify a filtering eigenvector, and applying the filtering eigenvector to one or more transmission chains to cancel self-interference on one or more receive chains.

Certain aspects of the present disclosure provide a system for self-interference cancellation by a wireless device. The system generally includes a processor and a memory. The processor is generally configured to, in an acquisition phase, iteratively acquire received power measurements for different receives chains for transmissions sent via a plurality of beam directions, estimate a self-interference subspace eigenvector based, at least in part, on the received power measurements, based on the estimated self-interference subspace eigenvector, perform a local search of a nullspace to identify a filtering eigenvector, and apply the filtering eigenvector to one or more transmission chains to cancel self-interference on one or more receive chains.

Certain aspects of the present disclosure provide a system for self-interference cancellation by a wireless device. The system generally includes means for, in an acquisition phase, iteratively acquiring received power measurements for different receive chains for transmissions sent via a plurality of beam directions, means for estimating a self-interference subspace eigenvector based, at least in part, on the received power measurements, means for performing, based on the estimated self-interference subspace eigenvector, a local search of a nullspace to identify a filtering eigenvector, and means for applying the filtering eigenvector to one or more transmission chains to cancel self-interference on one or more receive chains.

Certain aspects of the present disclosure provide a computer-readable medium for self-interference cancellation by a wireless device. The computer-readable medium generally comprises instructions that, when executed, cause a wireless device to iteratively acquire, in an acquisition phase, received power measurements for different receive chains for transmissions sent via a plurality of beam directions, estimate a self-interference subspace eigenvector based, at least in part, on the received power measurements, based on the estimated self-interference subspace eigenvector, perform a local search of a nullspace to identify a filtering eigenvector, and apply the filtering eigenvector to one or more transmission chains to cancel self-interference on one or more receive chains.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
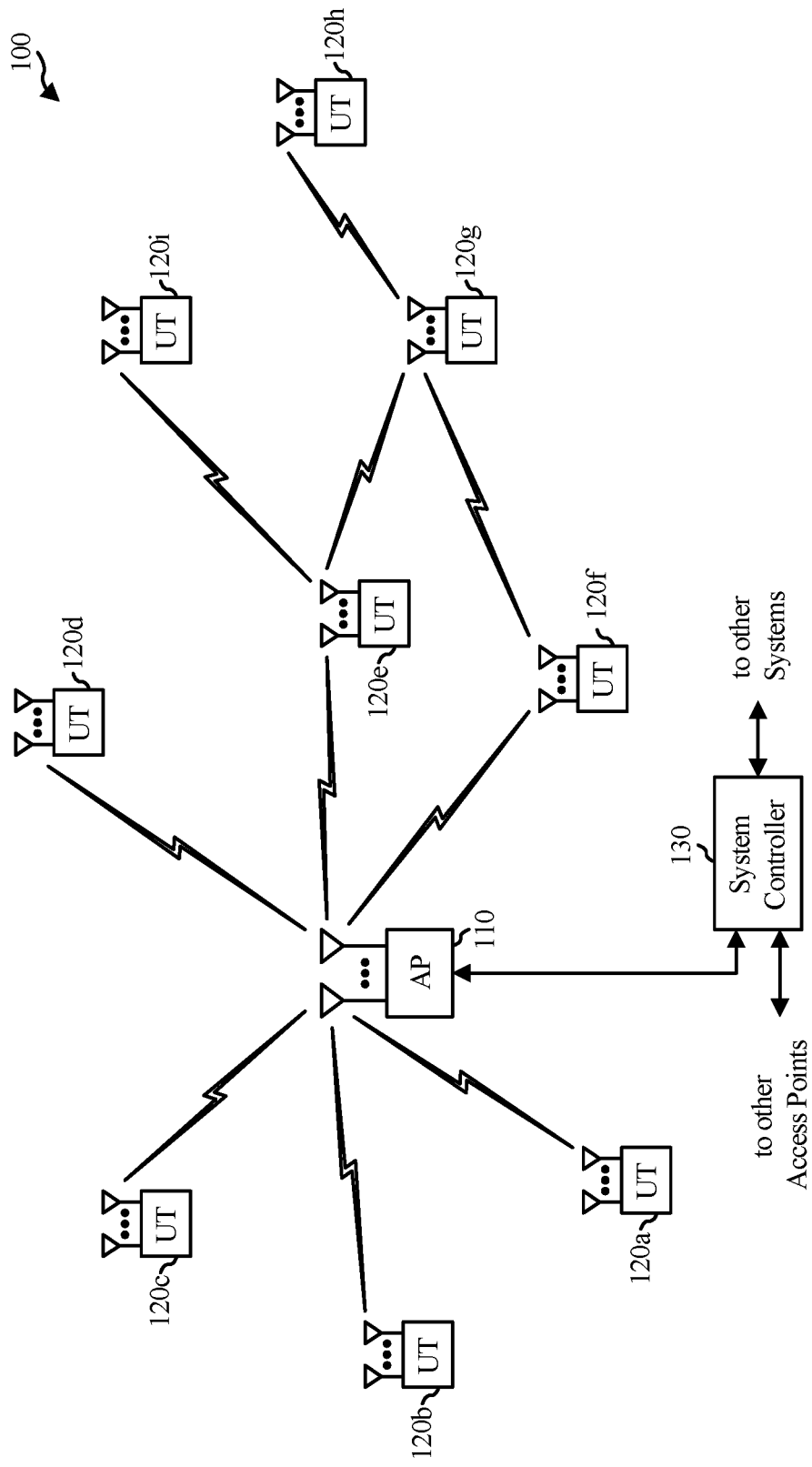
FIG. 1 is a diagram of an example wireless communications network in accordance with certain aspects of the present disclosure.

Aspects of the present disclosure provide techniques and apparatus for performing transmitter beamforming to cancel self-interference experienced on receive chains and generated by one or more transmit chains. To perform transmitter beamforming, a wireless device can generate an estimated self-interference subspace eigenvector based on power measurements performed for different receive chains and a plurality of beam directions. The wireless device can perform a local space of a nullspace to identify a filtering eigenvector based on the estimated self-interference subspace eigenvector and apply the filtering eigenvector to one or more transmission chains.

By generating and applying a filtering eigenvector to one or more transmission chains, a wireless device can cancel self-interference on receive chains caused by transmissions performed on one or more transmission chains. Cancelling self-interference on receive chains may allow a wireless device to perform full-duplex operations (e.g., transmitting and receiving on the same frequency bands).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The techniques described herein may be used for various wireless communication networks such as code division multiple access (CDMA), time division multiple access (TDMA), frequency division multiple access (FDMA), orthogonal FDMA (OFDMA), single carrier FDMA (SC-FDMA) and other networks. The terms "network" and "system"" are often used interchangeably. A CDMA network may implement a radio access technology (RAT) such as universal terrestrial radio access (UTRA), cdma2000, etc. UTRA includes wideband CDMA (WCDMA) and other variants of CDMA. cdma2000 covers IS-2000, IS-95 and IS-856 standards. IS-2000 is also referred to as 1× radio transmission technology (1×RTT), CDMA2000 1×, etc. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP long-term evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and RATs mentioned above as well as other wireless networks and RATs.

It is noted that while aspects may be described herein using terminology commonly associated with 3G and/or 4G wireless technologies, aspects of the present disclosure can be applied in other generation-based communication systems, such as 5G and later.

FIG. 1 illustrates a wireless communications system 100 with devices including access points 110 and user terminals 120, in which aspects of the present disclosure may be practiced. For simplicity, only one access point 110 is shown in FIG. 1. An access point (AP) is generally a fixed station that communicates with the user terminals and may also be referred to as a base station (BS), an evolved Node B (eNB), or some other terminology. A user terminal (UT) may be fixed or mobile and may also be referred to as a mobile station (MS), an access terminal, user equipment (UE), a station (STA), a client, a wireless device, or some other terminology. A user terminal may be a wireless device, such as a cellular phone, a personal digital assistant (PDA), a handheld device, a wireless modem, a laptop computer, a tablet, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal 120 may be equipped with a single antenna (e.g., in order to keep costs down) or multiple antennas (e.g., where the additional cost can be supported).

The access point 110 and/or user terminal 120 may include an analog-to-digital converter (ADC), which may be used, for example, to convert analog baseband signals to digital in-phase (I) or quadrature (Q) signals for digital signal processing.

Figure 2:
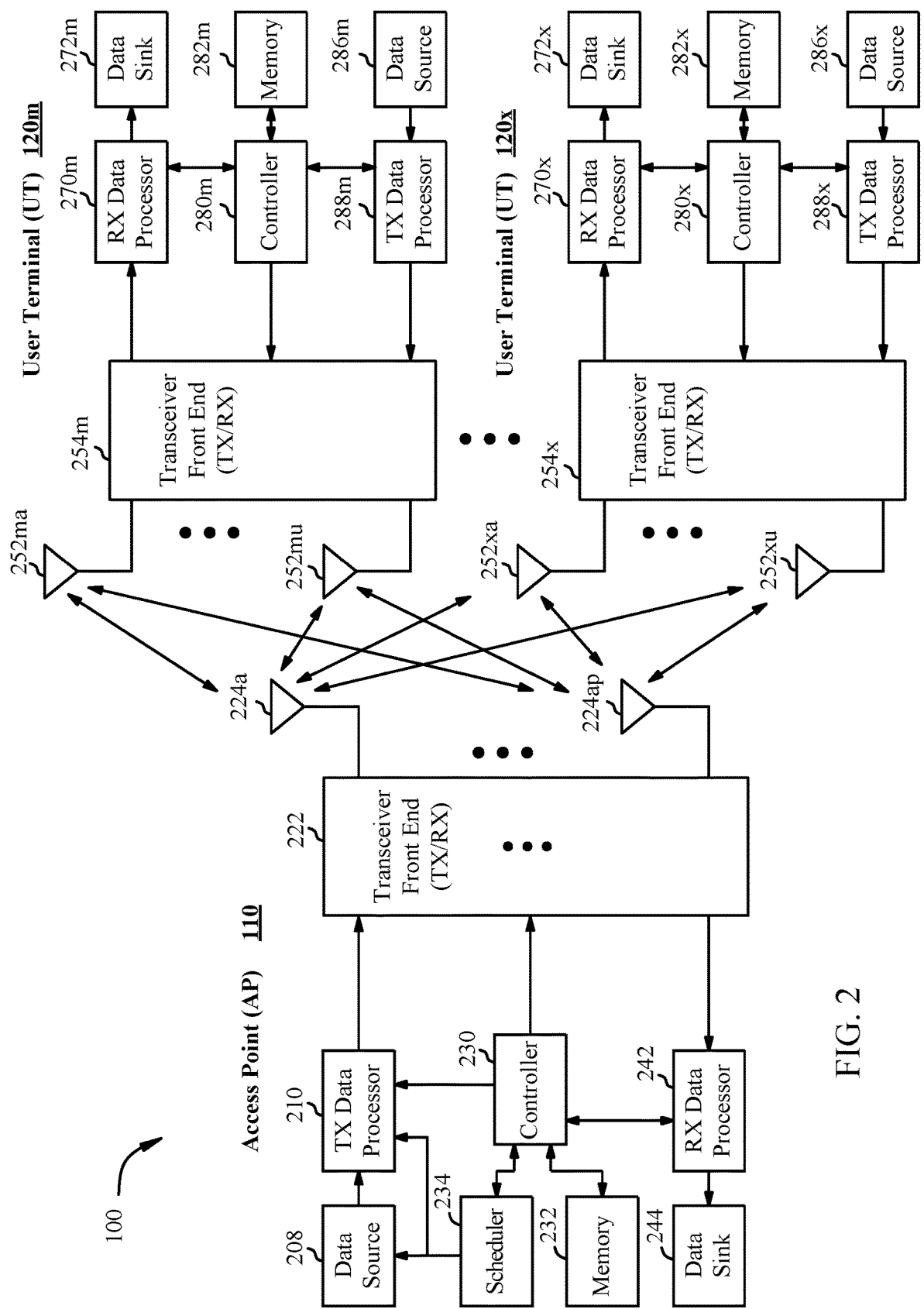
FIG. 2 is a block diagram of an example access point (AP) and example user terminals in accordance with certain aspects of the present disclosure.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 (also known as a radio frequency front end (RFFE)) receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254. Memory 282 may store data and program codes for the user terminal 120 and may interface with the controller 280.

A number $N_{up}$ of user terminals 120 may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. The signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal. An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

The transceiver front end (TX/RX) 222 of access point 110 and/or transceiver front end 254 of user terminal 120 may include an ADC, which may be used to convert baseband signals to digital I or Q signals for digital signal processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222. Memory 232 may store data and program codes for the access point 110 and may interface with the controller 230.

At each user terminal 120, $N_{ut,m}$ antennas 252 receive the downlink signals from access point 110. For receive diversity at the user terminal 120, the transceiver front end 254 may select signals received from one of the antennas 252 for processing. The signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Those skilled in the art will recognize the techniques described herein may be generally applied in systems utilizing any type of multiple access schemes, such as TDMA, SDMA, Orthogonal Frequency Division Multiple Access (OFDMA), CDMA, SC-FDMA, TD-SCDMA, and combinations thereof.

Figure 3:
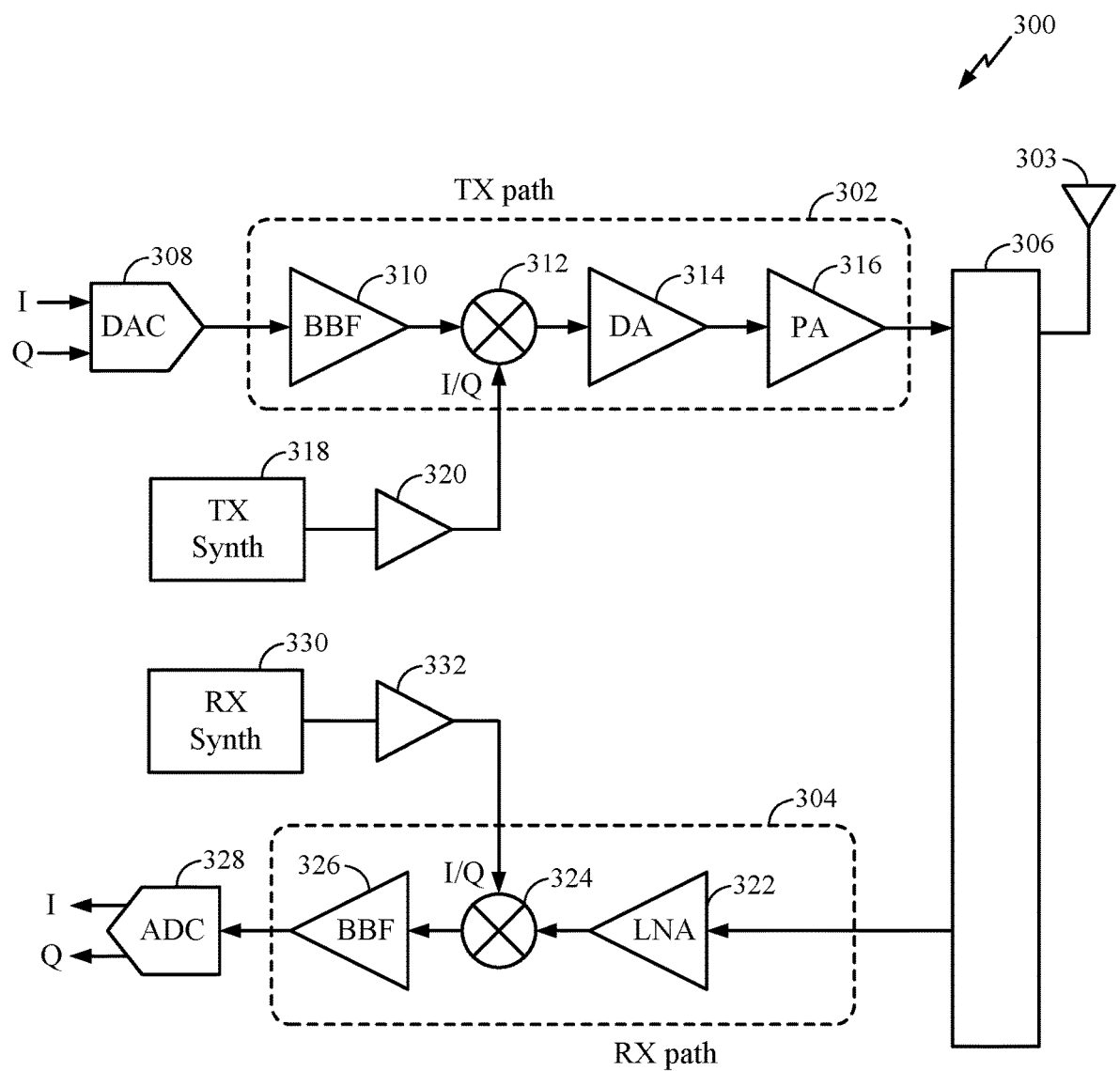
FIG. 3 is a block diagram of an example transceiver front end in accordance with certain aspects of the present disclosure.

FIG. 3 is a block diagram of an example transceiver front end 300, such as transceiver front ends 222, 254 in FIG. 2, in which aspects of the present disclosure may be practiced. The transceiver front end 300 includes a transmit (TX) path 302 (also known as a transmit chain) for transmitting signals via one or more antennas and a receive (RX) path 304 (also known as a receive chain) for receiving signals via the antennas. When the TX path 302 and the RX path 304 share an antenna 303, the paths may be connected with the antenna via an interface 306, which may include any of various suitable RF devices, such as a duplexer, a switch, a diplexer, and the like.

Receiving in-phase (I) or quadrature (Q) baseband analog signals from a digital-to-analog converter (DAC) 308, the TX path 302 may include a baseband filter (BBF) 310, a mixer 312, a driver amplifier (DA) 314, and a power amplifier (PA) 316. The BBF 310, the mixer 312, and the DA 314 may be included in a radio frequency integrated circuit (RFIC), while the PA 316 is often external to the RFIC. The BBF 310 filters the baseband signals received from the DAC 308, and the mixer 312 mixes the filtered baseband signals with a transmit local oscillator (LO) signal to convert the baseband signal of interest to a different frequency (e.g., upconvert from baseband to RF). This frequency conversion process produces the sum and difference frequencies of the LO frequency and the frequency of the signal of interest. The sum and difference frequencies are referred to as the beat frequencies. The beat frequencies are typically in the RF range, such that the signals output by the mixer 312 are typically RF signals, which may be amplified by the DA 314 and/or by the PA 316 before transmission by the antenna 303.

The RX path 304 includes a low noise amplifier (LNA) 322, a mixer 324, and a baseband filter (BBF) 326. The LNA 322, the mixer 324, and the BBF 326 may be included in a radio frequency integrated circuit (RFIC), which may or may not be the same RFIC that includes the TX path components. RF signals received via the antenna 303 may be amplified by the LNA 322, and the mixer 324 mixes the amplified RF signals with a receive local oscillator (LO) signal to convert the RF signal of interest to a different baseband frequency (i.e., downconvert). The baseband signals output by the mixer 324 may be filtered by the BBF 326 before being converted by an analog-to-digital converter (ADC) 328 to digital I or Q signals for digital signal processing. In certain aspects of the present disclosure, the ADC 328 may include a plurality of SARs, each configured to process the baseband signal with reference to a designated segment of a voltage range of the baseband signal to increase conversion speed of the ADC 328.

While it is desirable for the output of an LO to remain stable in frequency, tuning to different frequencies indicates using a variable-frequency oscillator, which involves compromises between stability and tunability. Contemporary systems may employ frequency synthesizers with a voltage-controlled oscillator (VCO) to generate a stable, tunable LO with a particular tuning range. Thus, the transmit LO frequency may be produced by a TX frequency synthesizer 318, which may be buffered or amplified by amplifier 320 before being mixed with the baseband signals in the mixer 312. Similarly, the receive LO frequency may be produced by an RX frequency synthesizer 330, which may be buffered or amplified by amplifier 332 before being mixed with the RF signals in the mixer 324.

The controller 230, and 280, along with the TX/RX circuitry 222, 254, and/or transceiver front end 300 may perform the operations described herein. For example, the controller 230, 280 may perform or direct operations performed by an apparatus for performing self-interference cancellation using transmitter beamforming, as described herein.

Example Transmitter Beamforming for Self-Interference Cancellation

Figure 4:
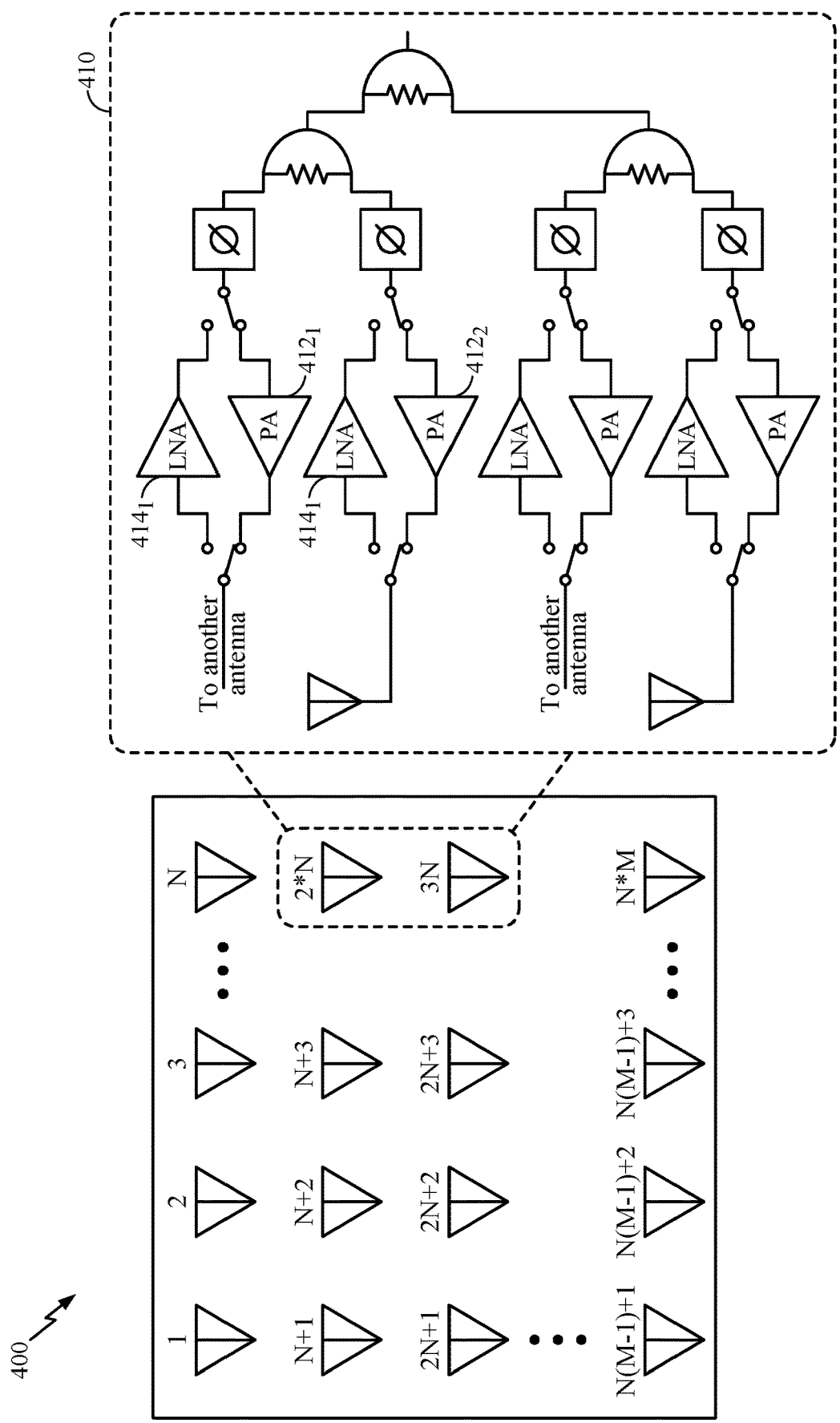
FIG. 4 is a diagram illustrating an example N×M antenna array, in accordance with certain aspects of the present disclosure.

As described herein, RF receive and transmit chains may include one or more components illustrated in FIG. 3. According to one example, a receive chain may include any combination of (and is not limited to) filters, low noise amplifiers (LNA), mixers, oscillators, variable gain amplifiers (VGA), power splitters/combiners, switches, phase shifters, attenuators, couplers, IQ demodulators, and ADCs, not necessarily in this order. According to on example, a transmit chain may include any combination of (and is not limited to) filters, power amplifiers (PA), mixers, oscillators, variable gain amplifiers (VGA), power splitters/combiners, switches, phase shifters, attenuators, couplers, IQ modulators, and DACs, not necessarily in this order FIG. 4 illustrates an example N×M array 400 of antenna elements, according to aspects of the present disclosure. As illustrated each antenna element may be connected to its own transceiver chain 410. Accordingly, each antenna may be connected to a PA 412 for transmission and LNA 414 for reception.

Figure 5:
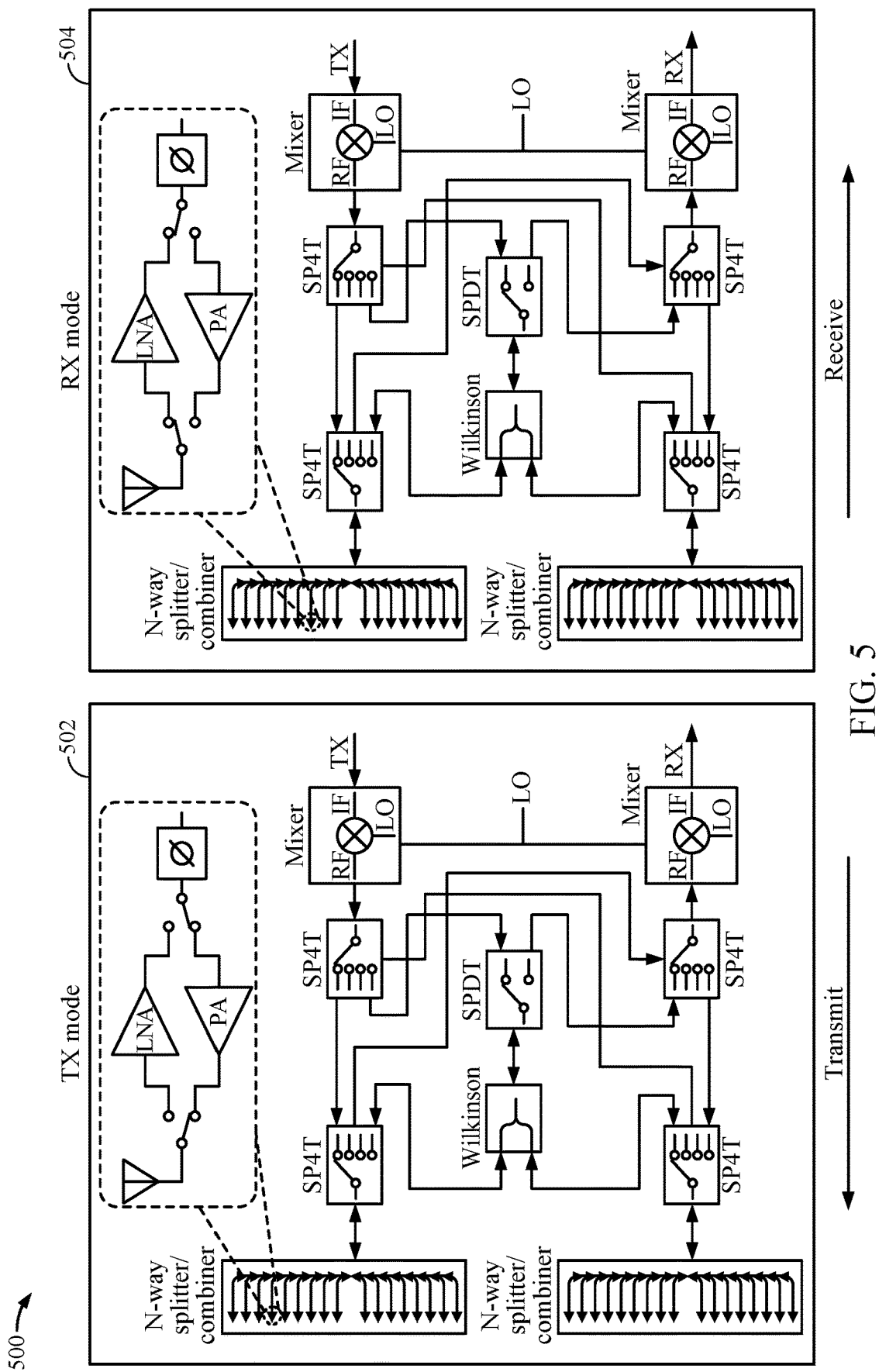
FIG. 5 is a diagram illustrating all antenna elements of the array in a transmit mode and all antenna elements of the array in a receive mode, for example during normal operation, in accordance with certain aspects of the present disclosure.

FIG. 5 illustrates a transceiver configuration for an antenna array 500, wherein the entire array may be in either a transmit mode or a receive mode, according to aspects of the present disclosure. The antenna array shown in FIG. 5 may include the array 400 in FIG. 4. As illustrated in FIG. 5, signals may be routed such that every antenna element in the array is in a transmit mode, as shown at 502, or in a receive mode, as shown at 504. In certain scenarios, such as during regular operation, the antenna array may operate in a transmit mode or a receive mode as illustrated in FIG. 5

Figure 6:
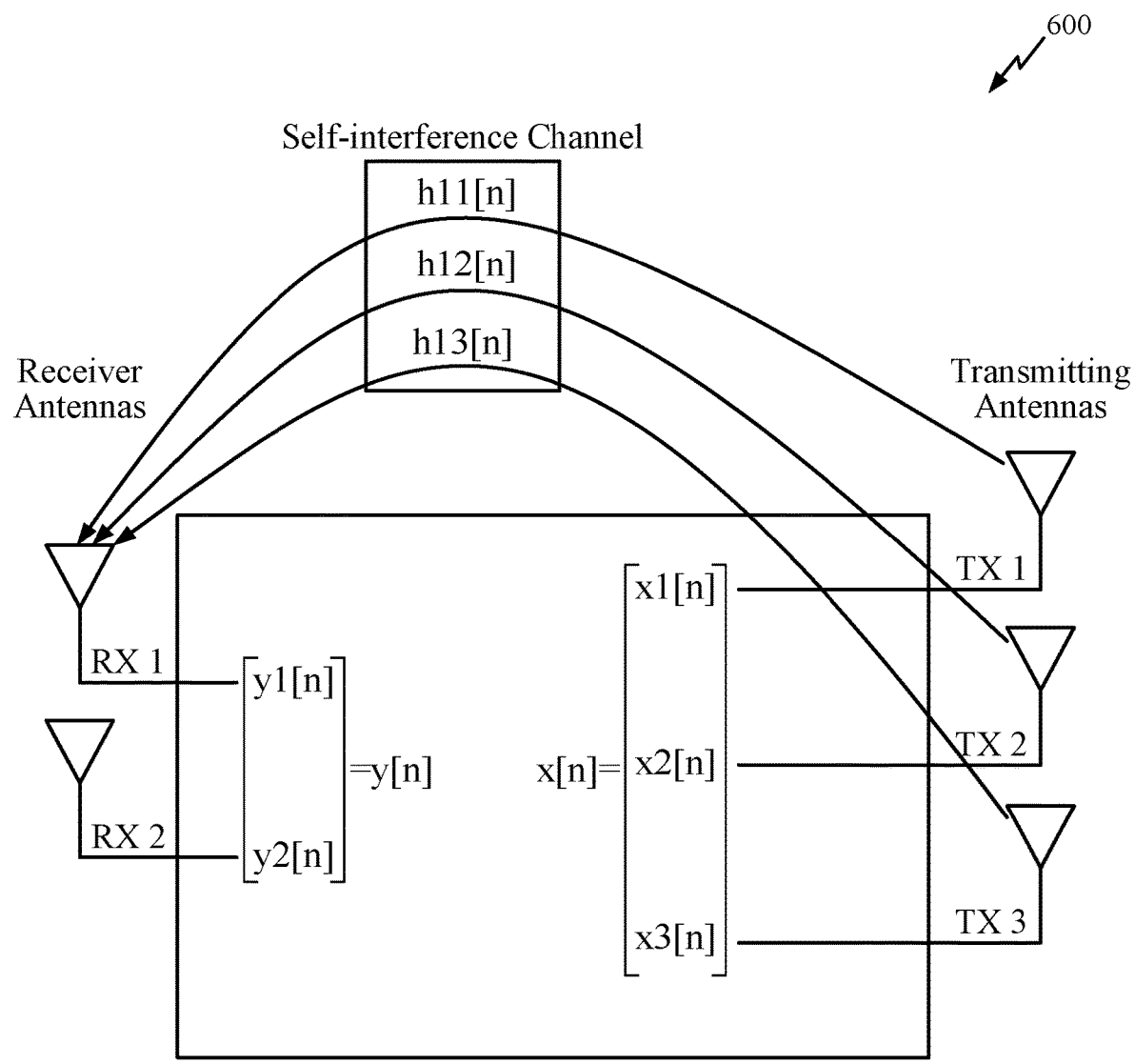
FIG. 6 illustrates self-interference channels between transmit chains and receive chains, in accordance with certain aspects of the present disclosure.

FIG. 6 illustrates an example of self-interference 600 on a radio front end caused by transmissions through one or more transmitting antennas, in accordance with an aspect of the present disclosure. The self-interference channels illustrated herein may be experienced by one or more receive antennas in an antenna array 500 illustrated in FIG. 5 based on transmissions performed on one or more transmit antennas in antenna array 500.

Self-interference may occur in half-duplex systems (e.g., where a transmission frequency differs from a reception frequency) due to out-of-band emissions. In such systems, interference may be generated, for example, due to non-linear distortion in a transmission chain, insufficient filtering at a receive chain of signals transmitted on the transmission frequency. Self-interference may also occur in full-duplex systems (e.g., where the same frequency is used for transmission and reception at a wireless device). In such a case, filtering may not be possible because the interference signal experienced at a receive chain is on the same frequency as other transmissions received on the receive chain.

To achieve full-duplex capabilities, self-interference generated from the transmission chains may need to be suppressed. According to aspects of the present disclosure, self-interference experienced by receive chains and generated from transmission chains in a full-duplex system may be suppressed, or cancelled, by generating filtering based on power measurements at one or more receive chains. As discussed herein, the filtering may be generated using an initial acquisition phase to obtain power measurements at the one or more receive chains and generate an estimate of the self-interference channels and an optimization phase to refine the estimated self-interference channels.

In a multiple-input multiple-output (MIMO) radio system with $N_{RX}$ receiver antennas and N transmitter antennas, the transmitted signals may be identified as x[n], where $x[n] \in \mathbb{C}^{N_{TX}+1}$. The received samples may be identified as y[n], where $y[n] \in \mathbb{C}^{N_{RX}+1}$. n may represent a sample index. A received sample y[n] may be represented according to the following equation:

$$y[n] = H[n] * x[n] + n_w[n] = \sum_{k=0}^{L_H-1} H[k]x[n-k] + n_w[n]$$

H[n] may be a matrix sequence, $H[n] \in \mathbb{C}^{N_{RX} \times N_{TX}}$ that includes the impulse response of a channel for each transmitter/receiver antenna pair. The $N^{th}$ row of H[n] may contain the $n^{th}$ sample of the impulse response between all transmitter antennas and the $n^{th}$ receiving antenna. An example H[n] may be represented as the following matrix:

$$H[n] = \begin{bmatrix} h_{11}[n] & h_{21}[n] & \ldots & h_{1N_{TX}}[n] \\ h_{21}[n] & h_{22}[n] & \ldots & h_{2N_{TX}}[n] \\ \ldots & \ldots & \ldots & \ldots \\ h_{N_{RX}1}[n] & h_{N_{RX}2}[n] & \ldots & h_{N_{RX}N_{TX}}[n] \end{bmatrix}$$

Figure 7:
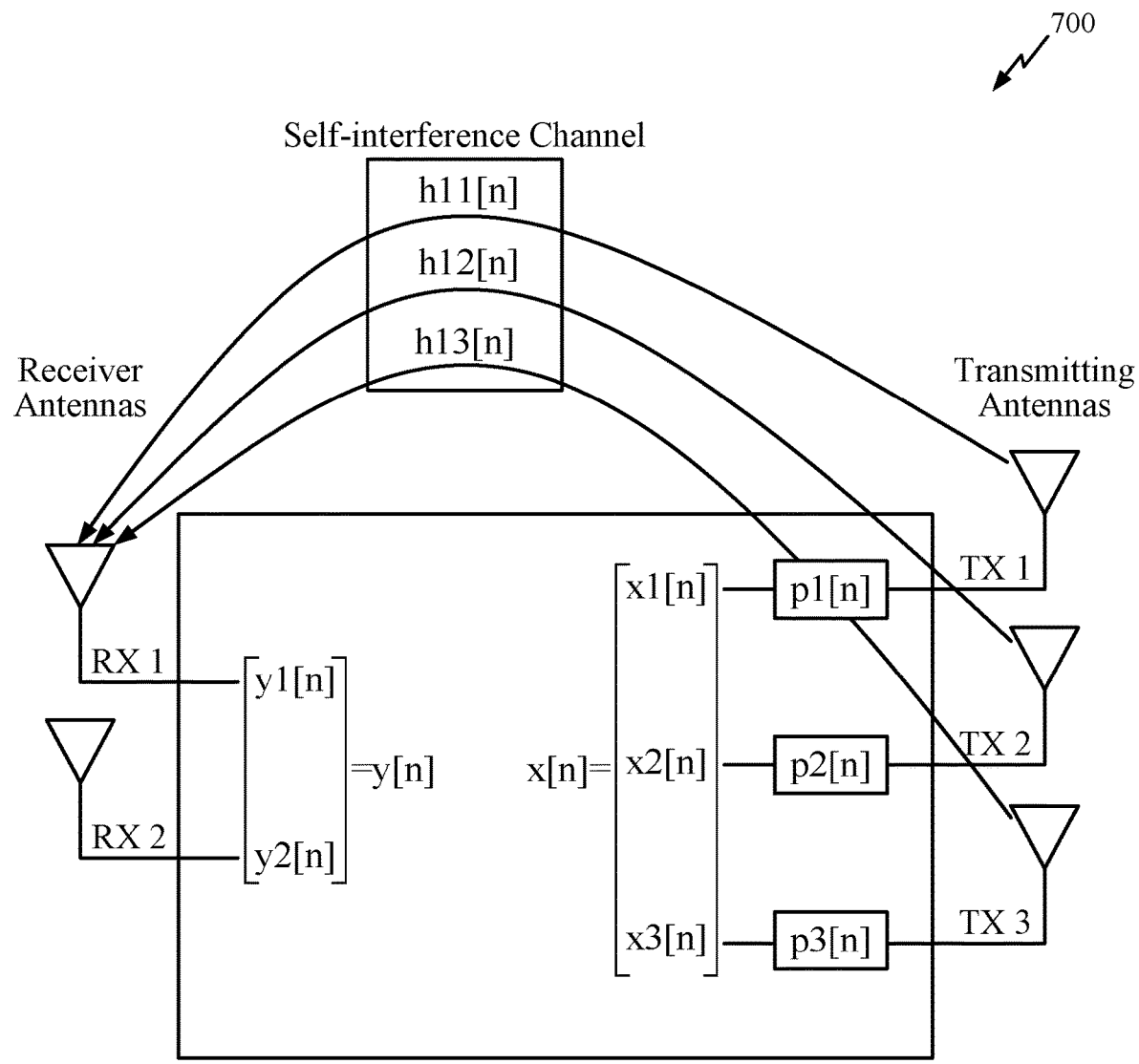
FIG. 7 illustrates a transmission beamforming scheme for minimizing self-interference, in accordance with certain aspects of the present disclosure.

As illustrated in FIG. 7, a finite impulse response (FIR) filter may be added to each transmit chain in a wireless device to cancel self-interference on a receive chain caused by transmissions performed on a transmit chain. The FIR filter may have a number of taps, $N_{PRE}$, which may be equal to the tap length of the self-interference channel.

For a beamforming filter, p[n] may represent the column vector that contains the $n^{th}$ coefficient of all the filters. p[n] may be represented as $p[n]=[p_1[n], p_2[n], \ldots, p_{N_{TX}}[n]]^T$. Thus, each received sample y[n] may be represented according to the following equation:

$$y[n] = H[n] * (p[n] * s[n]) = H[n] * \left( \sum_{k=0}^{N_{PRE}-1} P[k]s[n-k] \right) =$$

$$(H[n] * p[n]) * s[n] = \left( \sum_{k=0}^{N_{PRE}-1} p[k]H[n-k] \right) * s[n]$$

For every n, the condition of interference cancellation may be represented as the equation:

$$y[n] = \left( \sum_{k=0}^{N_{PRE}-1} p[k]H[n-k] \right) * s[n] = 0_{N_{RX}}$$

A convolution matrix $H_{CONV}$ may be defined to intertwine space and time dimensions. The convolution matrix $H_{CONV}$ may have dimensions of $[(N_{PRE}*N_{TX}), (L_{EFF}*N_{RX})]$ and may be represented as:

$$H_{conv} = \begin{bmatrix} H^T[0] & H^T[1] & \ldots & H^T[L_P-1] & \ldots & H^T[L_H-1] & \ldots \\ 0 & H^T[0] & \ldots & H^T[L_P-2] & \ldots & H^T[L_H-2] & \ldots \\ 0 & 0 & \ldots & H^T[L_P-3] & \ldots & H^T[L_H-3] & \ldots \\ \ldots & \ldots & \ldots & \ldots & \ldots & \ldots & \ldots \\ \ldots & \ldots & \ldots & \ldots & \ldots & \ldots & \ldots \\ 0 & 0 & \ldots & H^T[0] & \ldots & H^T[L_H-L_P] & \ldots \end{bmatrix}$$

Using $H_{conv}$, the effective self-interference channel and convolution of filter impulse response and channels may be represented as:

$$h_{eff} = \left( \sum_{k=0}^{L_P-1} P[k]H[n-k] \right) = H_{conv}^T p_{vec}$$

$P_{vec}$ may be the column vector having a size of $N_{PRE}*N_{TX}$ that contains the filter coefficients and may be represented as:

$$p_{vec}=[p^T[0],p^T[1], \ldots, p^T[L_{PRE}-1]]^T$$

The length of the effective channel $L_{EFF}$ may be equal to $N_{PRE}+N_{CH}-1$. The interference cancellation, for a non-zero $\|p_{vec}\|$, may be represented as:

$$\|h_{eff}\| = \|H_{conv}^T p_{vec}\| = 0$$

In some cases, null-space based beamforming may be used to choose a vector $p_{vec}$ that satisfies an interference cancellation condition. In null-space based beamforming, assuming that the convolution matrix is not full-rank, there exists a basis of the nullspace of the convolution matrix such that $\forall u \in \mathcal{N}(H_{conv}^T)$, $H_{conv}^T u = 0_{L_{eff}}$. The interference condition to be satisfied may be represented as:

$$\text{if } p_{vec} \in \mathcal{N}(H_{conv}^T),$$
$$H_{conv}^T p_{vec} = 0_{L_{eff}} \rightarrow \|H_{conv}^T p_{vec}\| = \|h_{eff}\| =$$
$$0 \rightarrow y[n] = h_{eff} * x[n] = 0_{N_{RX}}$$

In a case where $H_{conv}^T$ is known, the basis of a desired nullspace may be found using an eigenvector decomposition of the Hermitian matrix $H^*_{conv} H_{conv}^T = U \Lambda U^H$, where $\Lambda = \text{diag}(\lambda_1, \lambda_2, \ldots)$ and $U = [u_1, u_2, \ldots]$. The eigenvectors u may have corresponding eigenvalues $\lambda_i = 0$ and may form an orthonormal basis of the nullspace. $P_{vec}$ may be represented according to the following equation:

$$\sum_{j \in S} w(j) * u_j$$
$$\{i \in S \mid \lambda_i = 0\}$$

In some cases, the $H_{conv}$ matrix may be unknown, as a receiving system may not be able to directly estimate the self-interference channel. In some cases, transmitted power may cause saturation in a receiving chain. For example, a typical transmitted power (e.g., of +23 dBm) may exceed the dynamic range of elements in a receive chain, such as a low noise amplifier (LNA) or analogue-to-digital converter (ADC). Training oriented to channel estimation may not be feasible, as transmissions may be prioritized, which may not allow for reductions in transmission power.

Reliable power measurements may be available below the saturation power of a receive chain. Because receivers may be susceptible to saturation caused by transmission power, a comparator may be inserted in a receive chain to allow for power estimation (e.g., by comparing a received power measurement to a saturation threshold to identify a beam direction having a received power measurement exceeding the saturation threshold), as discussed herein. Information known to a receiver may be a function of the received power, $f(P_{RX})$, which may be represented as:

$$f(P_{RX}) = \begin{cases} \hat{P}_{MAX}, & \text{if } P_{RX} > P_{TH} \text{ and } P_{RX} > P_{DR} \\ \hat{P}_{TH}, & \text{if } P_{RX} < P_{TH} \text{ and } P_{RX} > P_{DR} \\ P_{RX}, & \text{if } P_{RX} < P_{DR} \end{cases}$$

where $P_{DR}$ represents the saturation power level for an ADC in a receive chain and $P_{MAX}$ and $P_{TH}$ represent reference values for the output of the comparator. The threshold value $P_{TH}$ may be variable and controlled by a receiver.

In some cases, in direct conversion receivers, mismatches in the receiving paths of in-phase (I) and quadrature (Q) signals (IQ imbalances) may create interference between the I and Q signals. To cancel interference caused by IQ imbalances, the vector $p_{vec}$ and convolution matrix $H_{conv}$ may be converted into real-valued models:

$$\bar{p}_{vec} = \begin{bmatrix} \text{Real}\{p_{vec}\} \\ \text{Imag}\{p_{vec}\} \end{bmatrix}, \bar{H}_{conv}^T = \begin{bmatrix} \text{Real}\{H_{conv}^T\} & -\text{Imag}\{H_{conv}^T\} \\ \text{Imag}\{H_{conv}^T\} & \text{Real}\{H_{conv}^T\} \end{bmatrix}$$

Real-valued interference cancellation that is robust with respect to IQ imbalances may be represented according to the following equation:

if $H_{conv}^T p_{vec} = h_{eff} \rightarrow \bar{H}_{conv}^T \bar{p}_{vec} = \bar{h}_{eff} \rightarrow \bar{y}[n] = h_{eff} * \bar{x}[n] = 0_{(2 \times N_{RX})}$ To cancel self-interference, aspects of the present disclosure use an estimation of self-interference based on received power measurements to identify a self-interference space. The estimated self-interference space can be refined to identify filters that can be applied to one or more transmission chains to cancel self-interference on one or more receive chains.

Figure 8:
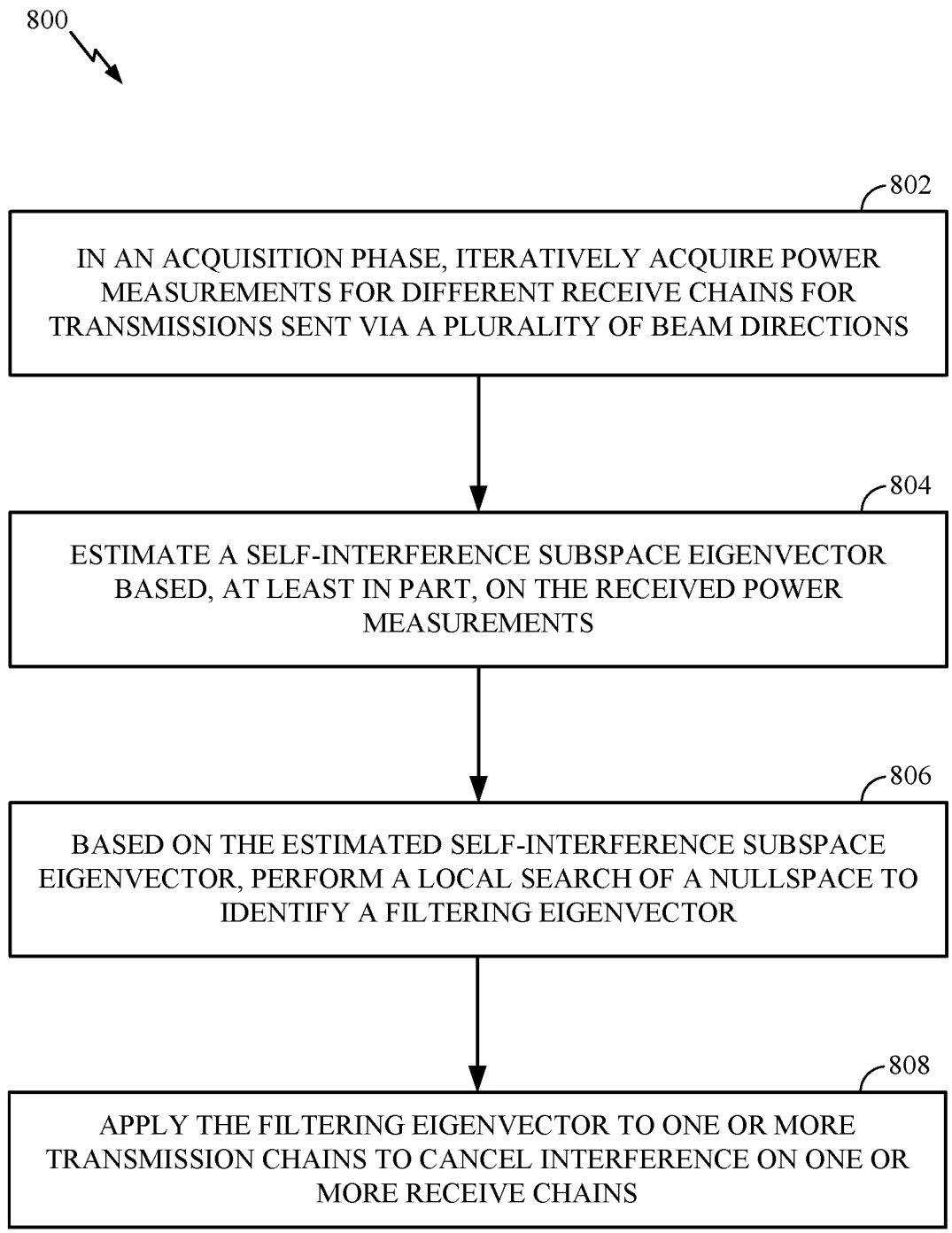
FIG. 8 illustrates example operations that may be performed by a wireless device for minimizing self-interference, in accordance with certain aspects of the present disclosure.

FIG. 8 illustrates example operations that may be performed by a wireless device for self-interference cancellation, in accordance with certain aspects of the present disclosure. As illustrated, operations 800 begin at 802, where, in an acquisition phase, a wireless device iteratively acquires received power measurements for different receive chains for transmissions sent via a plurality of beam directions. In some cases, as discussed herein, a wireless device can acquire received power measurements by identifying beam directions in which received power exceeds a saturation threshold value. At 804, the wireless device estimates a self-interference subspace eigenvector based, at least in part, on the received power measurements.

At 806, based on the estimated self-interference subspace eigenvector, the wireless device performs a local search of a nullspace to identify a filtering eigenvector. As discussed herein, the wireless device can perform a local search of a nullspace, for example, based on an estimated gradient in an approximation of a vector. At 808, the wireless device applies the filtering eigenvector to one or more transmission chains to cancel self-interference on one or more receive chains.

Figure 9:
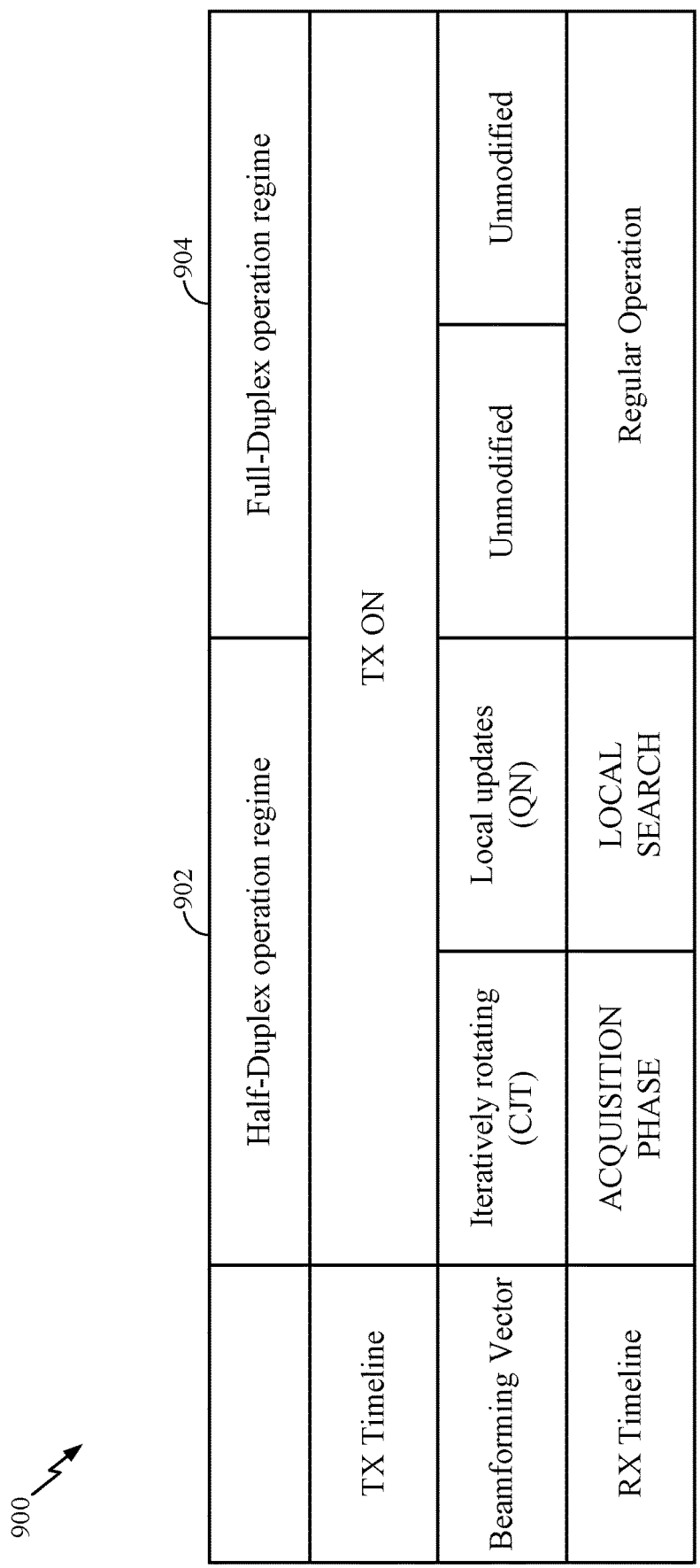
FIG. 9 illustrates an example timeline of operations that may be performed by a device for minimizing self-interference, in accordance with certain aspects of the present disclosure.

FIG. 9 illustrates an example timeline 900 for generating a filtering eigenvector to apply to one or more transmit chains for self-interference cancellation, in accordance with an aspect of the present disclosure. Timeline 900 includes a half-duplex operation regime (or half-duplex operation mode) 902 and a full-duplex operation regime (or full-duplex operation mode) 904. As illustrated, the acquisition phase and local search may be performed while the wireless device operates in half-duplex operation regime 902 (e.g., when the wireless device is operating in a receive-only mode or a transmit-only mode). After the local search is complete and a filtering eigenvector is identified, the wireless device can begin full-duplex operations (e.g., can transmit and receive simultaneously) and use the filtering eigenvector to cancel self-interference from the transmissions performed on one or more transmit chains.

In some cases, if a Hermitian matrix G and a matrix A are known, an eigenvector decomposition may be obtained using an iterative series of two-dimensional rotations. Matrix $A_0$ may be set to the Hermitian matrix G, and the $k+1^{th}$ matrix A may be represented as: $A_{k+1} = W_k A_k W_k^H$. $W_k$ may be a rotation matrix, $R_{(l,m)}(\theta_k)$, which may be equal to an identity matrix except for elements in positions (l, l), (m, m), (l, m), and (m, l) and may be represented as:

$$R_{(l,m)}(\theta_k) = \begin{bmatrix} 1 & 0 & \dots & 0 & \dots \\ \dots & \cos(\theta_k) & \dots & -\sin(\theta_k) & \dots \\ \dots & \dots & \dots & \dots & \dots \\ \dots & \sin(\theta_k) & \dots & \cos(\theta_k) & \dots \\ \dots & 0 & \dots & 0 & 1 \end{bmatrix} \begin{matrix} \leftarrow (l\text{-}th) \text{ row} \\ \\ \leftarrow (m\text{-}th) \text{ row} \end{matrix}$$

At convergence, matrix $A_k$ may be diagonal, and $(W_k W_{k-1} \dots W_0) G (W_0^T \dots W_{k-1}^T W_k^T) \rightarrow \Lambda$ $(W_0^T W_1^T \dots W_k^T) \rightarrow U = [\dots, u_i, \dots], \forall_i \in [1, N]$.

In some cases, neither matrix G nor matrix A may be known at a receiver. To estimate a self-interference subspace eigenvector, a receive matrix may assume that matrix G is an N×N Hermitian matrix and that the column vector $r_{(l, m)}(\theta)$ that satisfies the criteria:

$$\hat{\theta} = \arg\min_{\theta, \|r\|=1} \max P_{RX}(r(\theta))$$

is the $l^{th}$ column of the rotation matrix, $R_{(l,m)}(\theta_k)$ that cancels the (l, m) entry of matrix G. To minimize the above function, a receive chain may need to observe the received power, which depends on the angle as $\min (P_{RX}(G, r_{l,m}(\theta))) = \sigma_x^2 \min(\lambda(1)_{l,m}, \lambda(2)_{l,m})$ When minimizing terms corresponding to non-null eigenvalues, the minimum received power may be above saturation. For example, if $\min (\lambda(n)_{l,m} \neq 0)$, $P_{RX}(G, r_{l,m}(\theta)) > P_{DR}$. After the filtering eigenvector is identified, as discussed herein, the wireless device operates in full-duplex operation regime 904 (e.g., where the wireless device transmits data to other wireless devices and receives data from other wireless devices).

Figure 10:
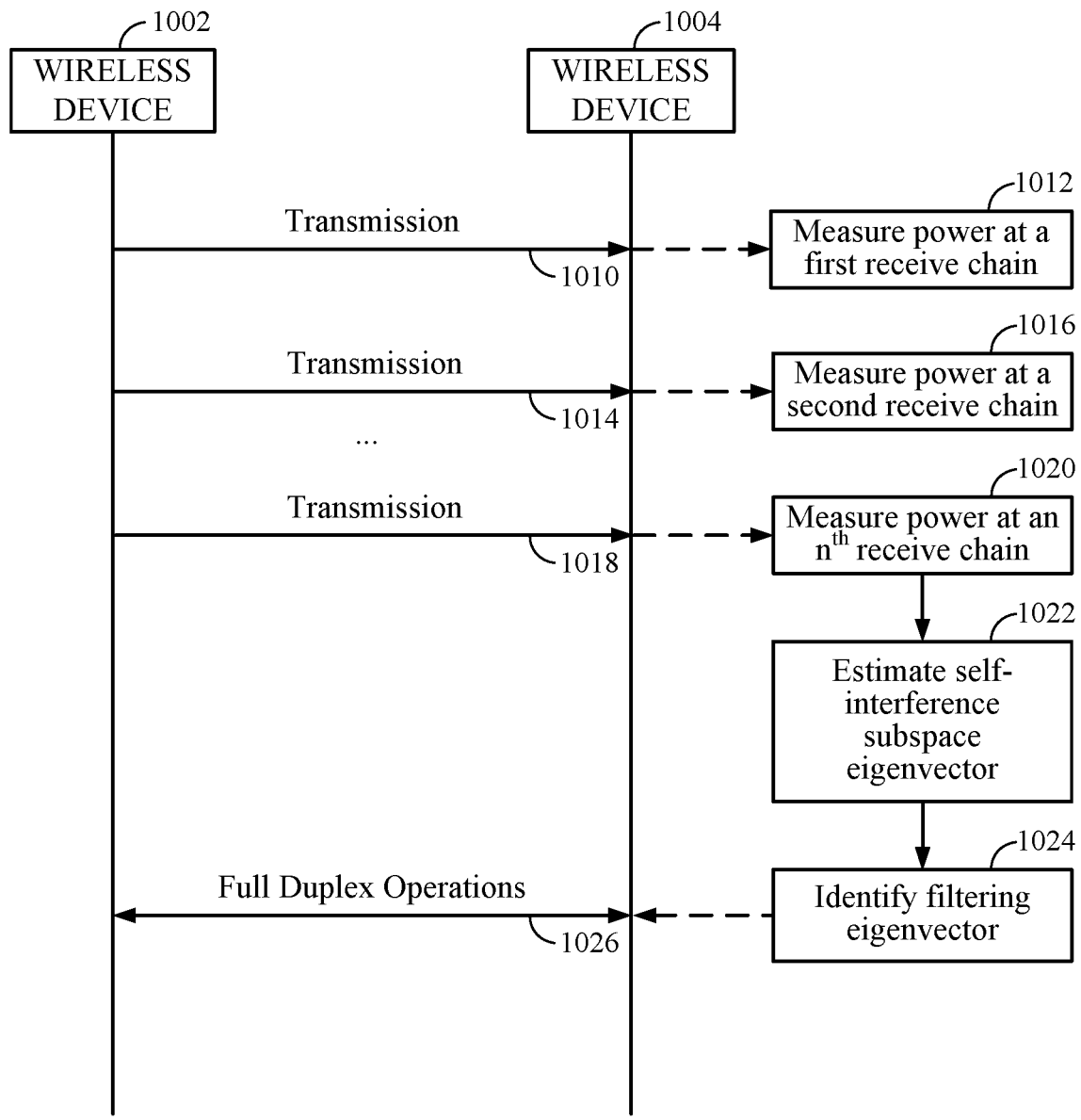
FIG. 10 illustrates an example message exchange between devices for minimizing self-interference at a device, in accordance with certain aspects of the present disclosure.

FIG. 10 illustrates a flow diagram of example messages that may be exchanged between wireless devices 1002 and 1004 for wireless device 1004 to identify a filtering eigenvector for self-interference cancellation, in accordance with an aspect of the present disclosure. As illustrated, a wireless device 1002 may perform transmissions 1010, 1014, and 1018, respectively, and wireless device 1004 may receive the transmissions to perform power measurements 1012, 1016, and 1020 for each of n receive chains. Each transmission may be transmitted by wireless device 1002 in one of a plurality of beam directions.

At 1022, wireless device 1004 estimates a self-interference subspace eigenvector. As discussed herein, the self-interference subspace eigenvector may represent an estimate of the self-interference channels based on the power measurements on one or more receive chains. At 1024, wireless device 1004 identifies a filtering eigenvector for cancelling self-interference on one or more receive chains. As discussed, wireless device 1004 can identify a filtering eigenvector by performing a local search of a nullspace based on the self-interference subspace eigenvector.

Figure 11A:
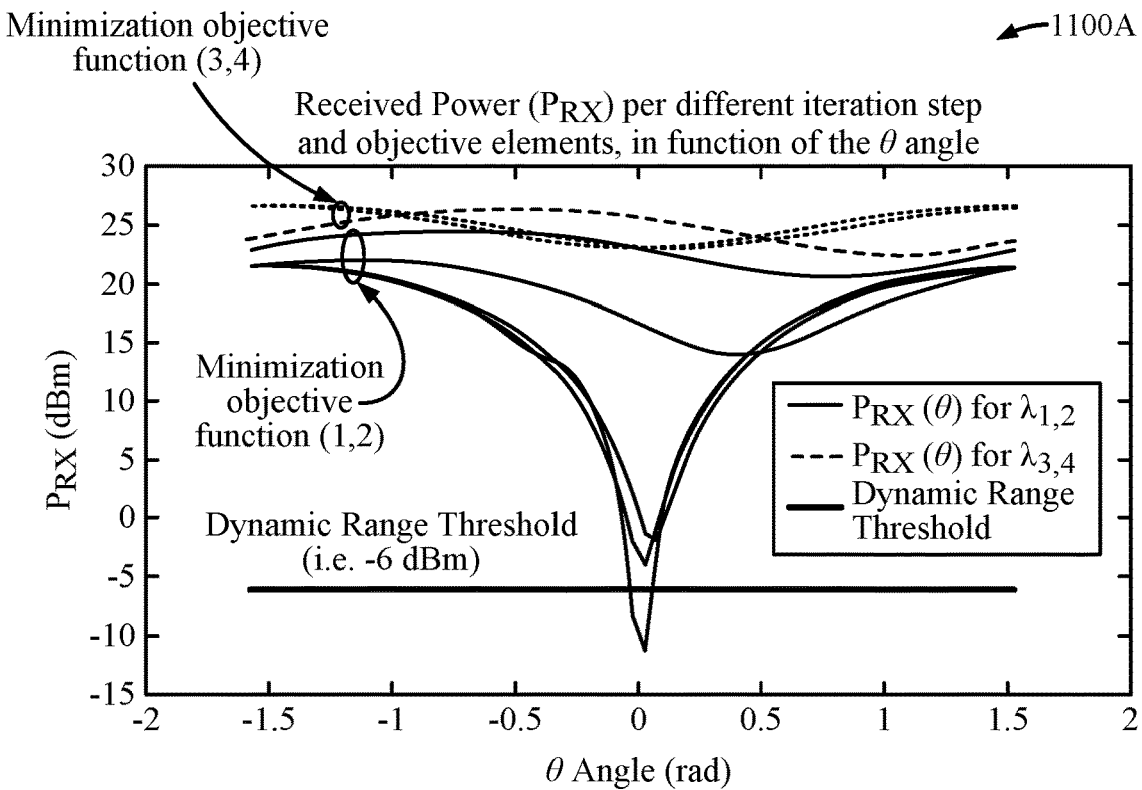
FIGS. 11A and 11B illustrate power measurements and estimation performed by a receiver, in accordance with certain aspects of the present disclosure.

FIG. 11A illustrates received power 1100A for different iterations as a function of the angle θ, in accordance with an aspect of the present disclosure. As illustrated, a received power may be greater than a threshold value (e.g., a saturation level threshold). Because received power is above saturation, minimization may be performed using threshold crossing detection, with a threshold chosen using a heuristic technique to improve estimation accuracy.

Figure 11B:
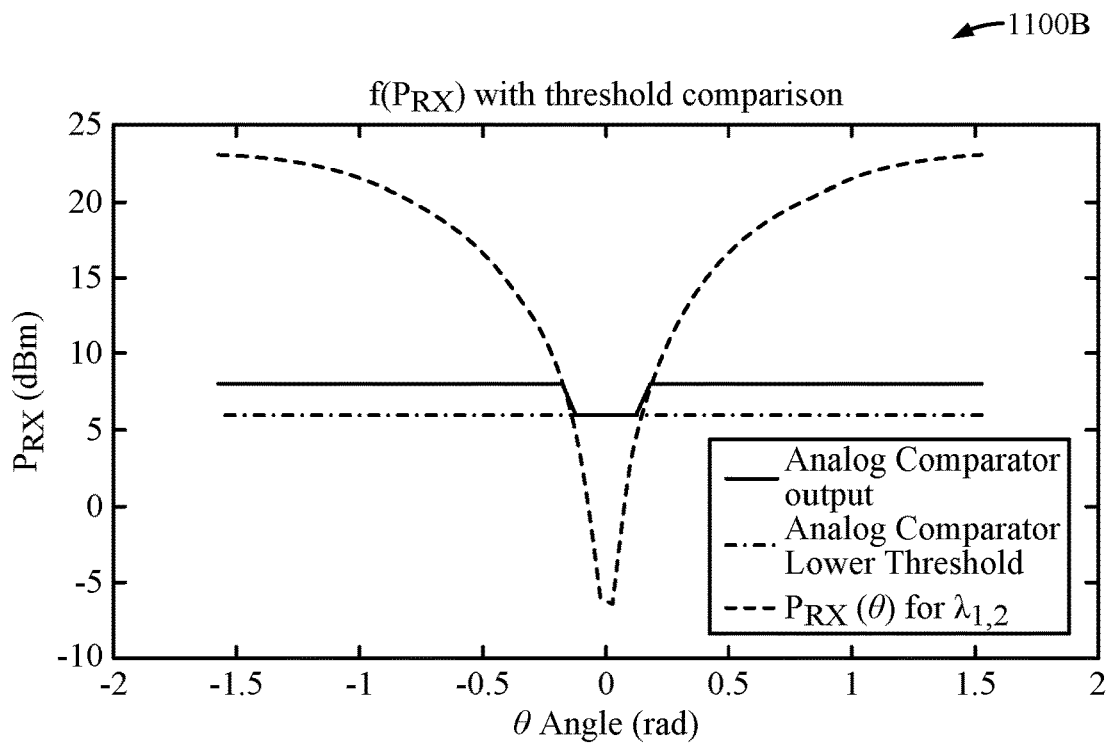

FIG. 11B illustrates threshold comparison 1100B for estimating a self-interference subspace eigenvector based, at least in part, on received power measurements. As illustrated, a comparator may generate an output identifying whether or not the received power measured at a receive chain is at or above saturation level. When received power exceeds the saturation level, the comparator can generate output indicating that received power is at or above the saturation level. At a received power level below a lower threshold, the comparator can indicate that the receiver can reliably measure received power.

Minimization using a threshold comparison may introduce errors in an algorithm used to estimate the self-interference subspace eigenvector. Thus, the estimated eigenvector matrix Û may differ from the true eigenvector matrix, and the receiver can select as an estimation of the base of the nullspace one or more vectors û in Û that minimizes the received power. In such a case, $p_{vec} = \hat{u}_i$, where $i = \arg\min_i P_{RX}(\hat{u}_i)$, with $\hat{u} \in \hat{U} = [u_1, u_2, \ldots]$.

To converge on a filtering eigenvector from the estimated self-interference subspace eigenvector, the wireless device can assume that the estimated self-interference subspace eigenvector is an estimation of the eigenvector that is close to the actual self-interference subspace eigenvector. The wireless device can perform a local search to optimize the estimated self-interference subspace eigenvector and obtain a filtering eigenvector to apply to the one or more transmit chains. The optimized vector $P_{opt}$ may be represented according to the equation: $\arg\min_{p, p \neq 0} p^H G p$.

Figure 12:
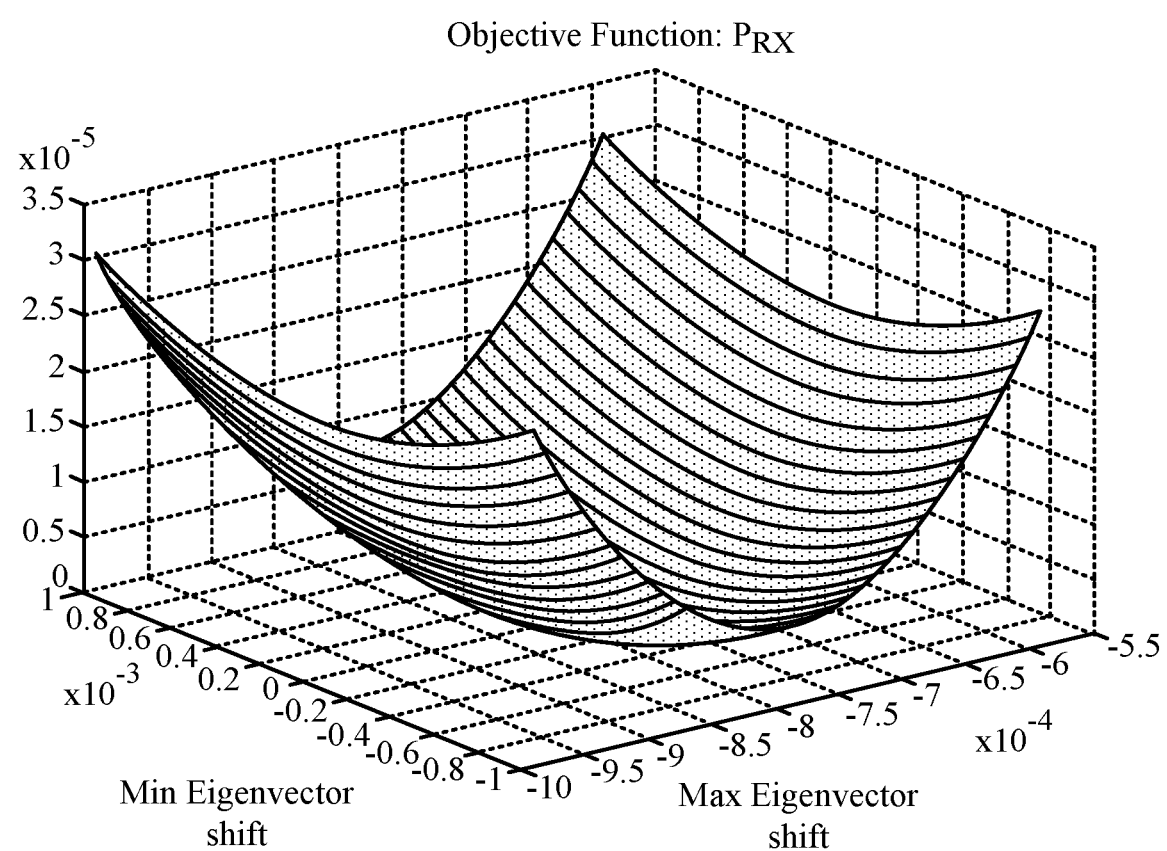
FIG. 12 illustrates an example received power graph at a receive chain, in accordance with certain aspects of the present disclosure.

FIG. 12 illustrates the received power measurements at a receive chain plotted in a three-dimensional space 1200, in accordance with aspects of the present disclosure. As illustrated the received power may be a quadratic form in an N-dimensional space. To identify the filtering eigenvector from the received power measurements and the estimated self-interference subspace eigenvector, the wireless device can perform a local search, which may include a gradient search or a quasi-Newton approach to approximate the objective function locally using a quadratic form model.

Optimizations may be iteratively repeated until received power is reduced sufficiently. In a gradient search, a wireless device measures the received power and estimates the gradient in $p_{vec,k}$ using a perturbation approximation. For each direction d:

$$\tilde{\nabla} f(p_{vec,k})_d = \frac{f(p_{vec,k} + \Delta_k \hat{u}_d) - f(p_{vec,k})}{\Delta_k}$$

The wireless device can perform a line search in a direction opposite that of a maximum increase in received power (e.g., opposite that of a maximum gradient), according to the following equations:

$$d = -\tilde{\nabla} f(p_{vec,k});$$
$$\alpha_{min} = \arg\min_\alpha (f(p_{vec,k} + \alpha d));$$
$$p_{k+1} = p_{vec,k} + \alpha_{min} d;$$

Using a quasi-Newtonian approach, a wireless device may measures the received power and estimates the gradient in $p_{vec,k}$ using a perturbation approximation. The wireless device may estimate a Hessian matrix and use an inverted estimated Hessian matrix to obtain a minimum point. According to one technique:

$$\hat{H}_{k+1} = \hat{H}_k + \frac{q_k q_k^T}{q_k^T s_k} - \frac{\hat{H}_k s_k s_k^T \hat{H}_k}{s_k^T \hat{H}_k s_k}$$
$$s_k = p_{vec,k+1} - p_{vec,k}$$
$$q_k = \tilde{\nabla} f(p_{vec,k+1}) - \tilde{\nabla} f(p_{vec,k})$$

The wireless device may subsequently perform a line search in a direction of the minimum point of the quadratic form model, which may be represented as: $d = -H^{-1} \tilde{\nabla} f(p_{vec,k+1})$.

In some cases, heuristics may be defined for the line searches to satisfy convergence criteria. In some cases, heuristics may also be defined for the perturbation steps for gradient estimation, as convergence on the filtering eigenvector may depend on the perturbation approximation used to estimate a gradient in $p_{vec,k}$.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for self-interference cancellation, comprising:
   in an acquisition phase, iteratively acquiring received power measurements for different receive chains for transmissions sent via a plurality of beam directions;
   estimating a self-interference subspace eigenvector based, at least in part, on the received power measurements;
   based on the estimated self-interference subspace eigenvector, performing a local search of a nullspace to identify a filtering eigenvector, wherein performing the local search of the nullspace comprises one of:
      iteratively estimating a gradient in the received power measurements for each of the plurality of beam directions, identifying a maximum gradient increase, and performing a line search in a direction opposite a direction of the maximum gradient increase, or
      iteratively estimating a gradient in the received power measurements for each of the plurality of beam directions, identifying a minimum point in an inverted Hessian matrix estimated from the received power measurements, and performing a line search in a direction of the identified minimum point; and
   applying the filtering eigenvector to one or more transmission chains to cancel self-interference on one or more receive chains.

2. The method of claim 1, wherein the acquisition phase is performed while in a transmit-only mode.

3. The method of claim 2, wherein the filtering eigenvector is applied while in a full-duplex operation mode.

4. The method of claim 1, further comprising:
   comparing a received power measurement to a saturation threshold, wherein estimating the self-interference subspace eigenvector is based on identifying a beam direction having a received power exceeding the saturation threshold.

5. A system for self-interference cancellation, comprising:
   a processor configured to:
      in an acquisition phase, iteratively acquire received power measurements for different receive chains for transmissions sent via a plurality of beam directions;
      estimate a self-interference subspace eigenvector based, at least in part, on the received power measurements;
      based on the estimated self-interference subspace eigenvector, perform a local search of a nullspace to identify a filtering eigenvector, wherein performing the local search of the nullspace comprises one of:
         iteratively estimating a gradient in the received power measurements for each of the plurality of beam directions, identifying a maximum gradient increase, and performing a line search in a direction opposite a direction of the maximum gradient increase, or
         iteratively estimating a gradient in the received power measurements for each of the plurality of beam directions, identifying a minimum point in an inverted Hessian matrix estimated from the received power measurements, and performing a line search in a direction of the identified minimum point; and
      apply the filtering eigenvector to one or more transmission chains to cancel self-interference on one or more receive chains, and
   a memory coupled to the processor.

6. The system of claim 5, wherein the acquisition phase is performed while in a transmit-only mode.

7. The system of claim 6, wherein the filtering eigenvector is applied while in a full-duplex operation mode.

8. The system of claim 5, wherein the processor is further configured to:
   compare a received power measurement to a saturation threshold, wherein estimating the self-interference subspace eigenvector is based on identifying a beam direction having a received power exceeding the saturation threshold.

9. A system for self-interference cancellation, comprising:
   means for, in an acquisition phase, iteratively acquiring received power measurements for different receive chains for transmissions sent via a plurality of beam directions;
   means for estimating a self-interference subspace eigenvector based, at least in part, on the received power measurements;
   means for performing, based on the estimated self-interference subspace eigenvector, a local search of a nullspace to identify a filtering eigenvector, wherein the means for performing the local search of the nullspace comprises one of:
      means for iteratively estimating a gradient in the received power measurements for each of the plurality of beam directions, means for identifying a maximum gradient increase, and means for performing a line search in a direction opposite a direction of the maximum gradient increase, or
      means for iteratively estimating a gradient in the received power measurements for each of the plurality of beam directions, means for identifying a minimum point in an inverted Hessian matrix estimated from the received power measurements, and means for performing a line search in a direction of the identified minimum point; and
   means for applying the filtering eigenvector to one or more transmission chains to cancel self-interference on one or more receive chains.

10. The system of claim 9, wherein the acquisition phase is performed while in a transmit-only mode.

11. The system of claim 10, wherein the filtering eigenvector is applied while in a full-duplex operation mode.

12. The system of claim 9, wherein the means for performing the local search of a nullspace comprises:
   means for iteratively estimating a gradient in the received power measurements for each of the plurality of beam directions;
   means for identifying a minimum point in an inverted Hessian matrix estimated from the received power measurements; and
   means for performing a line search in a direction of the identified minimum point.

13. A non-transitory computer-readable medium for self-interference cancellation comprising instructions that when executed cause a wireless device to:
  in an acquisition phase, iteratively acquire received power measurements for different receive chains for transmissions sent via a plurality of beam directions;
  estimate a self-interference subspace eigenvector based, at least in part, on the received power measurements;
  based on the estimated self-interference subspace eigenvector, perform a local search of a nullspace to identify a filtering eigenvector, wherein performing the local search of the nullspace comprises one of:
    iteratively estimating a gradient in the received power measurements for each of the plurality of beam directions, identifying a maximum gradient increase, and performing a line search in a direction opposite a direction of the maximum gradient increase, or
    iteratively estimating a gradient in the received power measurements for each of the plurality of beam directions, identifying a minimum point in an inverted Hessian matrix estimated from the received power measurements, and performing a line search in a direction of the identified minimum point; and
  apply the filtering eigenvector to one or more transmission chains to cancel self-interference on one or more receive chains.

14. The non-transitory computer-readable medium of claim 13, wherein the acquisition phase is performed while in a transmit-only mode.

15. The non-transitory computer-readable medium of claim 14, wherein the filtering eigenvector is applied while in a full-duplex operation mode.

16. The non-transitory computer-readable medium of claim 13, further comprising instructions for:
  comparing a received power measurement to a saturation threshold, wherein estimating the self-interference subspace eigenvector is based on identifying a beam direction having a received power exceeding the saturation threshold.

* * * * *